US006269587B1

(12) United States Patent
Wallace

(10) Patent No.: US 6,269,587 B1
(45) Date of Patent: Aug. 7, 2001

(54) SURF FISHING CADDY

(76) Inventor: Danny R. Wallace, 38494 Lindsey La., Ponchatoula, LA (US) 70454

( * ) Notice: Subject to any disclaimer, the term of this patent is extended or adjusted under 35 U.S.C. 154(b) by 0 days.

(21) Appl. No.: 09/533,135

(22) Filed: Mar. 23, 2000

(51) Int. Cl.[7] .......................... A01K 97/06; A01K 97/20
(52) U.S. Cl. .................... 43/54.1; 43/55; 206/315.11; 220/560; 220/592.25; 220/230; 224/920
(58) Field of Search ................... 43/54.1, 55, 56; 206/315.11; 224/920; 220/560, 592.2, 592.25, 915.2, 230; 441/129–131

(56) References Cited

U.S. PATENT DOCUMENTS

| | | | |
|---|---|---|---|
| 1,619,634 | * | 3/1927 | Roat ............................. 43/55 |
| 1,630,131 | * | 5/1927 | Messinger ....................... 43/56 |
| 3,015,406 | * | 1/1962 | Nolte ........................... 220/560 |
| 3,304,645 | * | 2/1967 | Hardesty et al. ................ 43/55 |
| 3,367,061 | * | 2/1968 | Brandemihl et al. .............. 43/55 |
| 3,678,611 | * | 7/1972 | Files ....................... 206/315.11 |
| 3,877,144 | * | 4/1975 | LeBlanc ........................ 43/54.1 |
| 3,919,803 | * | 11/1975 | Manguso ........................ 43/55 |
| 4,070,786 | * | 1/1978 | Dunham ......................... 43/55 |
| 4,110,552 | * | 8/1978 | Lombardi ..................... 220/230 |
| 4,208,826 | * | 6/1980 | Lindaman ..................... 224/920 |
| 4,271,624 | * | 6/1981 | Peluso ......................... 43/54.1 |
| 4,638,593 | * | 1/1987 | Garcia ......................... 43/54.1 |
| 4,642,934 | * | 2/1987 | Carlson et al. .................. 43/55 |
| 4,671,008 | * | 6/1987 | Lindemood ..................... 43/54.1 |
| 4,703,577 | * | 11/1987 | Gubash ......................... 43/54.1 |
| 4,794,723 | * | 1/1989 | Arnold et al. ................... 43/55 |
| 4,871,079 | * | 10/1989 | Doucette et al. ............... 220/560 |
| 4,878,311 | * | 11/1989 | Cano ........................... 43/54.1 |
| 4,887,716 | * | 12/1989 | Abraham ...................... 220/560 |
| 4,927,041 | * | 5/1990 | Hepburn ....................... 43/54.1 |
| 4,996,790 | * | 3/1991 | Ruggles ......................... 43/55 |
| 5,050,526 | * | 9/1991 | Nelson et al. ................... 43/55 |
| 5,065,867 | * | 11/1991 | Alfredson .................... 220/230 |
| 5,117,577 | * | 6/1992 | Burghoff ........................ 43/56 |
| 5,163,694 | * | 11/1992 | Reichek ....................... 43/54.1 |
| 5,305,544 | * | 4/1994 | Testa, Jr. ..................... 43/54.1 |
| 5,402,596 | * | 4/1995 | Gillming, Jr. ................. 43/54.1 |
| 5,505,014 | * | 4/1996 | Paullin ..................... 206/315.11 |
| 5,551,186 | * | 9/1996 | Harada .......................... 43/55 |
| 5,555,671 | * | 9/1996 | Voight et al. ................. 43/54.1 |
| 6,014,833 | * | 1/2000 | Benavidez .................... 43/54.1 |
| 6,016,933 | * | 1/2000 | Daily et al. .................. 220/560 |

* cited by examiner

Primary Examiner—Darren W. Ark
(74) Attorney, Agent, or Firm—Joseph N. Breaux

(57) ABSTRACT

A surf fishing caddy that includes a float body for supporting a cooler, a tackle box, a number of fishing rod holders, a fish retaining bag, and a number of tether rope attachment posts.

1 Claim, 1 Drawing Sheet

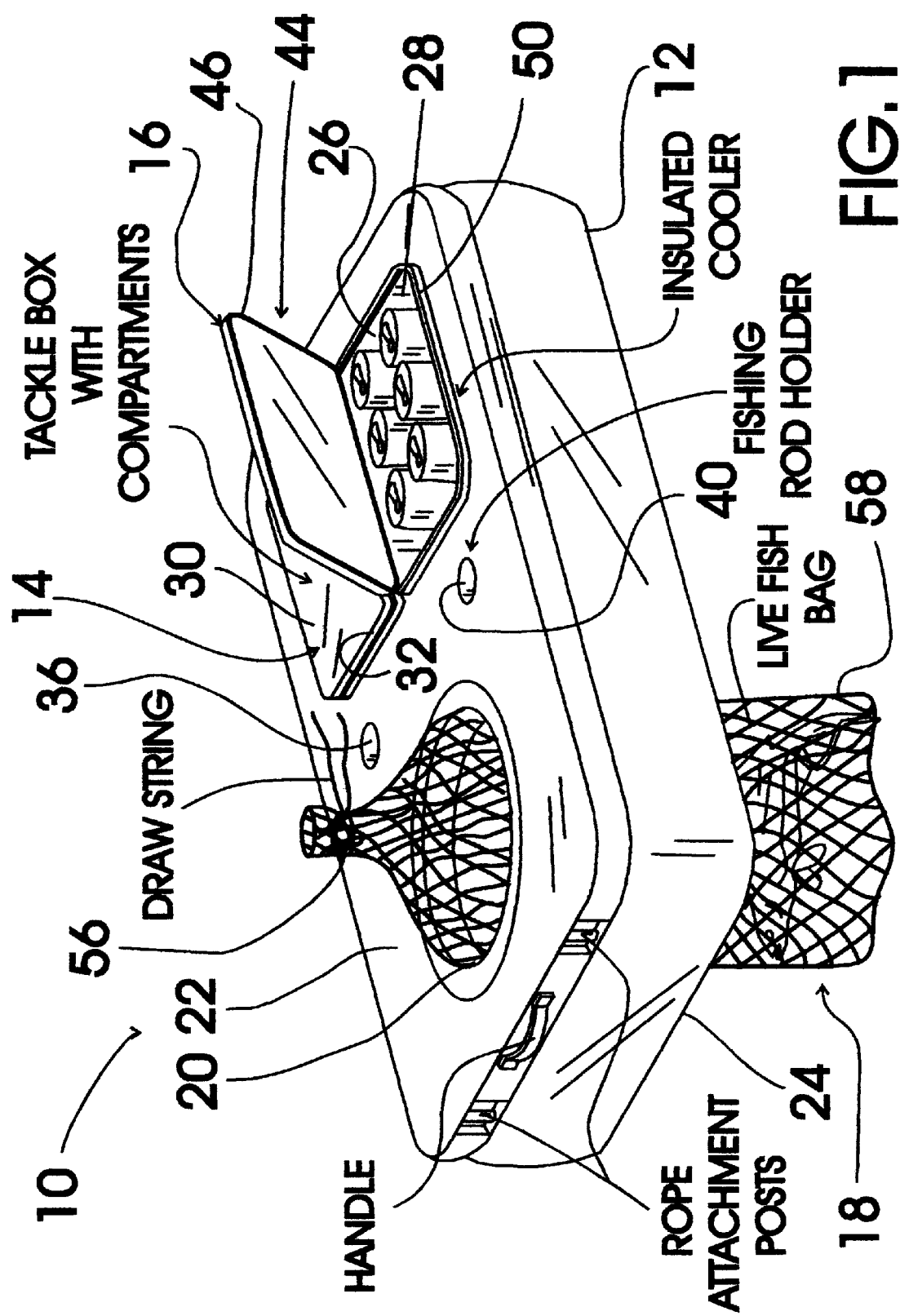

SURF FISHING CADDY

TECHNICAL FIELD

The present invention relates to fishing accessories and more particularly to a surf fishing caddy that includes a rectangular, closed cell foam float body, a tackle box compartment sealing door, a cooler compartment sealing door and a draw string sealable mesh bag; the rectangular, closed cell foam float body having a circular mesh bag passage aperture formed therethrough between a top float body surface and a bottom float body surface, a cooler compartment formed into the float body and accessible through a cooler opening formed through the top float body surface, a tackle box compartment formed into the float body and accessible through a tackle box opening formed through top float body surface, and two spaced cylinder shaped fishing rod handle insertion cavities formed through the top float body surface; the tackle box compartment sealing door being hingedly connected to the float body adjacent to the tackle box opening such that the tackle box compartment sealing door is pivotal into a closed tackle box position sealing the tackle box opening and magnetically held in the closed tackle box position by a magnetic securing mechanism including a resilient magnetic sealing gasket attached to the tackle box compartment sealing door and a magnetically attractable member positioned around a perimeter of the tackle box opening; the cooler compartment sealing door being hingedly connected to the float body adjacent to the cooler opening such that the cooler compartment sealing door is pivotal into a closed cooler position sealing the cooler opening and magnetically held in the closed cooler position by a magnetic securing mechanism including a resilient magnetic sealing gasket attached to the cooler compartment sealing door and a magnetically attractable member positioned around a perimeter of the cooler opening; the draw string sealable mesh bag being positioned through the circular mesh bag passage aperture and attached to the float body such that a draw string sealing assembly is positioned above the top float body surface and a fish holding portion is positioned beneath the bottom float body surface.

BACKGROUND ART

Surf fishing is a popular recreational pastime. Although surf fishing is enjoyed by many, carrying all of the items necessary for surf fishing out into the surf can be difficult. It would be a benefit, therefore, to have a surf fishing caddy that included a float body for supporting a cooler, a tackle box, a number of fishing rod holders, a fish retaining bag, and a number of tether rope attachment posts.

GENERAL SUMMARY DISCUSSION OF INVENTION

It is thus an object of the invention to provide a surf fishing caddy that includes a rectangular, closed cell foam float body, a tackle box compartment sealing door, a cooler compartment sealing door and a draw string sealable mesh bag; the rectangular, closed cell foam float body having a circular mesh bag passage aperture formed therethrough between a top float body surface and a bottom float body surface, a cooler compartment formed into the float body and accessible through a cooler opening formed through the top float body surface, a tackle box compartment formed into the float body and accessible through a tackle box opening formed through top float body surface, and two spaced cylinder shaped fishing rod handle insertion cavities formed through the top float body surface; the tackle box compartment sealing door being hingedly connected to the float body adjacent to the tackle box opening such that the tackle box compartment sealing door is pivotal into a closed tackle box position sealing the tackle box opening and magnetically held in the closed tackle box position by a magnetic securing mechanism including a resilient magnetic sealing gasket attached to the tackle box compartment sealing door and a magnetically attractable member positioned around a perimeter of the tackle box opening; the cooler compartment sealing door being hingedly connected to the float body adjacent to the cooler opening such that the cooler compartment sealing door is pivotal into a closed cooler position sealing the cooler opening and magnetically held in the closed cooler position by a magnetic securing mechanism including a resilient magnetic sealing gasket attached to the cooler compartment sealing door and a magnetically attractable member positioned around a perimeter of the cooler opening; the draw string sealable mesh bag being positioned through the circular mesh bag passage aperture and attached to the float body such that a draw string sealing assembly is positioned above the top float body surface and a fish holding portion is positioned beneath the bottom float body surface.

Accordingly, a surf fishing caddy is provided. The surf fishing caddy includes a rectangular, closed cell foam float body, a tackle box compartment sealing door, a cooler compartment sealing door and a draw string sealable mesh bag; the rectangular, closed cell foam float body having a circular mesh bag passage aperture formed therethrough between a top float body surface and a bottom float body surface, a cooler compartment formed into the float body and accessible through a cooler opening formed through the top float body surface, a tackle box compartment formed into the float body and accessible through a tackle box opening formed through top float body surface, and two spaced cylinder shaped fishing rod handle insertion cavities formed through the top float body surface; the tackle box compartment sealing door being hingedly connected to the float body adjacent to the tackle box opening such that the tackle box compartment sealing door is pivotal into a closed tackle box position sealing the tackle box opening and magnetically held in the closed tackle box position by a magnetic securing mechanism including a resilient magnetic sealing gasket attached to the tackle box compartment sealing door and a magnetically attractable member positioned around a perimeter of the tackle box opening; the cooler compartment sealing door being hingedly connected to the float body adjacent to the cooler opening such that the cooler compartment sealing door is pivotal into a closed cooler position sealing the cooler opening and magnetically held in the closed cooler position by a magnetic securing mechanism including a resilient magnetic sealing gasket attached to the cooler compartment sealing door and a magnetically attractable member positioned around a perimeter of the cooler opening; the draw string sealable mesh bag being positioned through the circular mesh bag passage aperture and attached to the float body such that a draw string sealing assembly is positioned above the top float body surface and a fish holding portion is positioned beneath the bottom float body surface.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a perspective view of an exemplary embodiment of the surf fishing caddy of the present invention showing the rectangular, closed cell foam float body having a circular mesh bag passage aperture formed therethrough between a top float body surface and a bottom float body surface, a cooler compartment formed into the float body and accessible through a cooler opening formed through the top float body surface, a tackle box compartment formed into the float body and accessible through a tackle box opening formed through top float body surface, and two spaced cylinder shaped fishing rod handle insertion cavities formed through the top float body surface; a tackle box compartment sealing door hingedly connected to the float body adjacent to the tackle box opening such that the tackle box compartment sealing door is pivotal into a closed tackle box position sealing the tackle box opening and magnetically held in the closed tackle box position by a magnetic securing mechanism including a resilient magnetic sealing gasket attached to the tackle box compartment sealing door and a magnetically attractable member positioned around a perimeter of the tackle box opening; a cooler compartment sealing door hingedly connected to the float body adjacent to the cooler opening such that the cooler compartment sealing door is pivotal into a closed cooler position sealing the cooler opening and magnetically held in the closed cooler position by a magnetic securing mechanism including a resilient magnetic sealing gasket attached to the cooler compartment sealing door and a magnetically attractable member positioned around a perimeter of the cooler opening; a draw string sealable mesh bag positioned through the circular mesh bag passage aperture such that a draw string sealing assembly is positioned above the top float body surface and a fish holding portion is positioned beneath the bottom float body surface.

EXEMPLARY MODE FOR CARRYING OUT THE INVENTION

FIG. 1 shows an exemplary embodiment of the surf fishing caddy of the present invention generally designated 10. Surf fishing caddy 10 includes a rectangular, closed cell foam float body, generally designated 12; a tackle box compartment sealing door, generally designated 14; a cooler compartment sealing door, generally designated 16; and a draw string sealable mesh bag, generally designated 18. Rectangular, closed cell foam float body 12 has a circular mesh bag passage aperture 20 formed therethrough between a top float body surface 22 and a bottom float body surface 24; a cooler compartment 26 formed into float body 12 and accessible through a rectangular shaped cooler opening 28 formed through top float body surface 22; a tackle box compartment 30 adjacent to and a mirror image of cooler compartment 26 formed into float body and accessible through a rectangular tackle box opening 32 (shown in dashed lines) formed through top float body surface 22; and two spaced cylinder shaped fishing rod handle insertion cavities 36,40 formed through top float body surface 22.

Tackle box compartment sealing door 14 and cooler sealing door 16, hereinafter sealing doors 14,16, are identical in construction and each is hingedly connected to float body 12 adjacent to a respective tackle box opening 32, cooler opening 28 such that the sealing doors 14,16 are pivotal into closed positions sealing opening 32,28 and are magnetically held in the closed position by a magnetic securing mechanism, generally designated 44 including a resilient magnetic sealing gasket 46 attached to the sealing door 14,16 and a magnetically attractable member 50 positioned around a perimeter of opening 32,28.

Draw string sealable mesh bag 18 is constructed of nylon mesh material and is positioned through circular mesh bag passage aperture 20 and attached to float body 12 such that a draw string sealing assembly 56 is positioned above top float body surface 22 and a fish holding portion 58 is positioned beneath bottom float body surface 24.

It can be seen from the preceding description that a surf fishing caddy has been provided.

It is noted that the embodiment of the surf fishing caddy described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A surf fishing caddy comprising:

a rectangular, closed cell foam float body;

a tackle box compartment sealing door;

a cooler compartment sealing door; and a draw string sealable mesh bag;

said rectangular, closed cell foam float body having a circular mesh bag passage aperture formed therethrough between a top float body surface and a bottom float body surface, a cooler compartment formed into said float body and accessible through a cooler opening formed through said top float body surface, a tackle box compartment formed into said float body and accessible through a tackle box opening formed through said top float body surface, and two spaced cylinder shaped fishing rod handle insertion cavities formed through said top float body surface;

said tackle box compartment sealing door being hingedly connected to said float body adjacent to said tackle box opening such that said tackle box compartment sealing door is pivotal into a closed tackle box position sealing said tackle box opening and magnetically held in said closed tackle box position by a magnetic securing mechanism including a resilient magnetic sealing gasket attached to said tackle box compartment sealing door and a magnetically attractable member positioned around a perimeter of said tackle box opening;

said cooler compartment sealing door being hingedly connected to said float body adjacent to said cooler opening such that said cooler compartment sealing door is pivotal into a closed cooler position sealing said cooler opening and magnetically held in said closed cooler position by a magnetic securing mechanism including a resilient magnetic sealing gasket attached to said cooler compartment sealing door and a magnetically attractable member positioned around a perimeter of said cooler opening;

said draw string sealable mesh bag being positioned through said circular mesh bag passage aperture and attached to said float body such that a draw string sealing assembly is positioned above said top float body surface and a fish holding portion is positioned beneath said bottom float body surface.

* * * * *